United States Patent [19]
Previati

[11] 3,784,338
[45] Jan. 8, 1974

[54] EXPANSIBLE SECTOR CORE FOR CURING BELTS

[75] Inventor: Augusto Previati, Milan, Italy

[73] Assignee: Industrie Pirelli S.p.A., Milan, Italy

[22] Filed: Apr. 9, 1971

[21] Appl. No.: 132,687

[30] Foreign Application Priority Data
Apr. 9, 1970   Italy .............................. 23080 A/70

[52] U.S. Cl. ...................... 425/28, 249/180, 425/54
[51] Int. Cl. ....... B29d 29/00, B29h 5/18, B29h 7/22
[58] Field of Search ................... 249/178, 180, 184, 249/186; 425/28

[56] References Cited
UNITED STATES PATENTS

| | | | |
|---|---|---|---|
| 2,598,655 | 5/1952 | Ambler | 425/28 |
| 1,711,963 | 5/1929 | Perry | 249/180 |
| 733,313 | 7/1903 | Cramer | 249/180 |
| 796,789 | 8/1905 | Adam | 249/180 |
| 1,626,897 | 5/1927 | Wedberg | 249/180 X |
| 3,497,174 | 2/1970 | Nayagam | 249/180 |
| 668,474 | 2/1901 | Adam | 249/180 |
| 1,162,961 | 12/1915 | Williams | 249/180 |
| 1,183,324 | 5/1916 | Steele | 249/178 |
| 461,453 | 10/1891 | Sherman | 249/180 |
| 870,144 | 11/1907 | Walker | 249/180 |

FOREIGN PATENTS OR APPLICATIONS

| | | | |
|---|---|---|---|
| 1,055,421 | 4/1959 | Germany | 249/180 |
| 774,994 | 1934 | France | 249/180 |
| 723,912 | 1965 | Great Britain | 249/180 |
| 798,231 | 1958 | Great Britain | 249/180 |

Primary Examiner—J. Howard Flint, Jr.
Attorney—Stevens, Davis, Miller & Mosher

[57] ABSTRACT

The invention relates to an expansible type core for a belt curing mold. A plurality of complementary sectors are interfitted to form a cylinder and, in addition, means are provided for interlocking the sectors in expanded position against either axial or radial displacement relative to each other. Further, the sectors are expansible symmetrically relative to the core axis.

6 Claims, 8 Drawing Figures

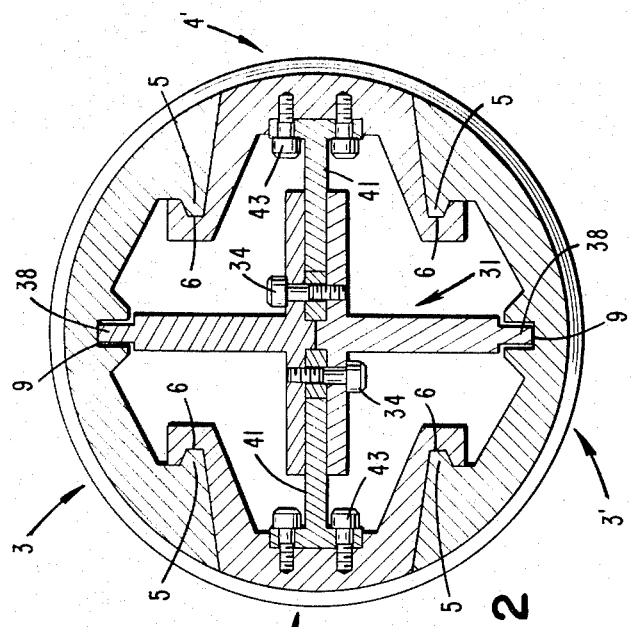
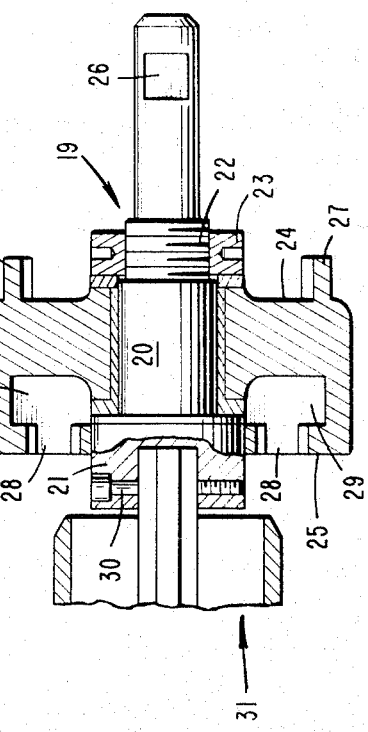
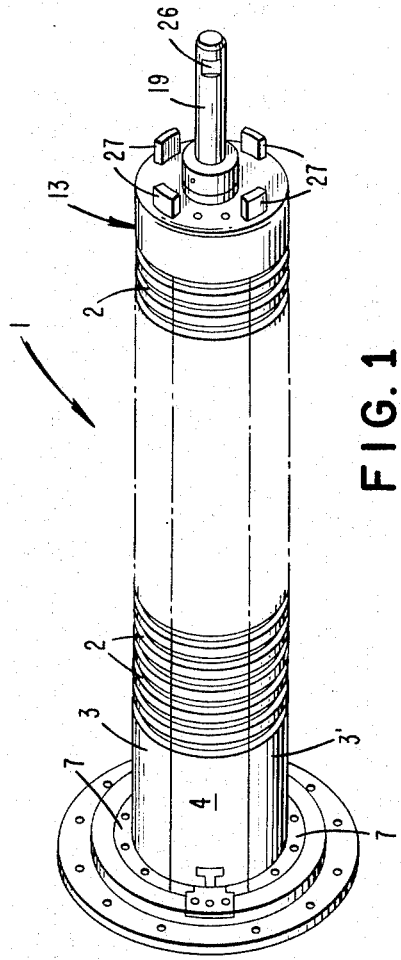
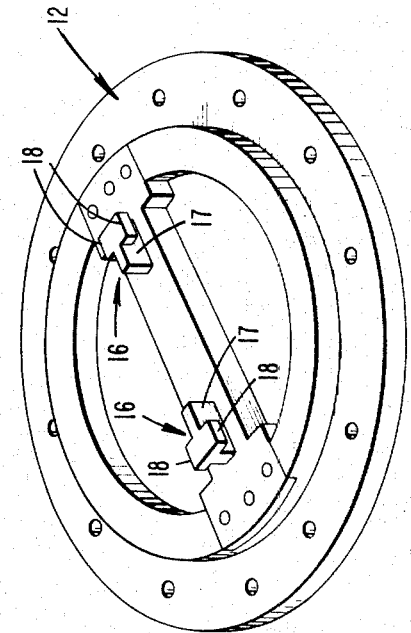
INVENTOR
AUGUSTO PREVIATI

INVENTOR
AUGUSTO PREVIATI

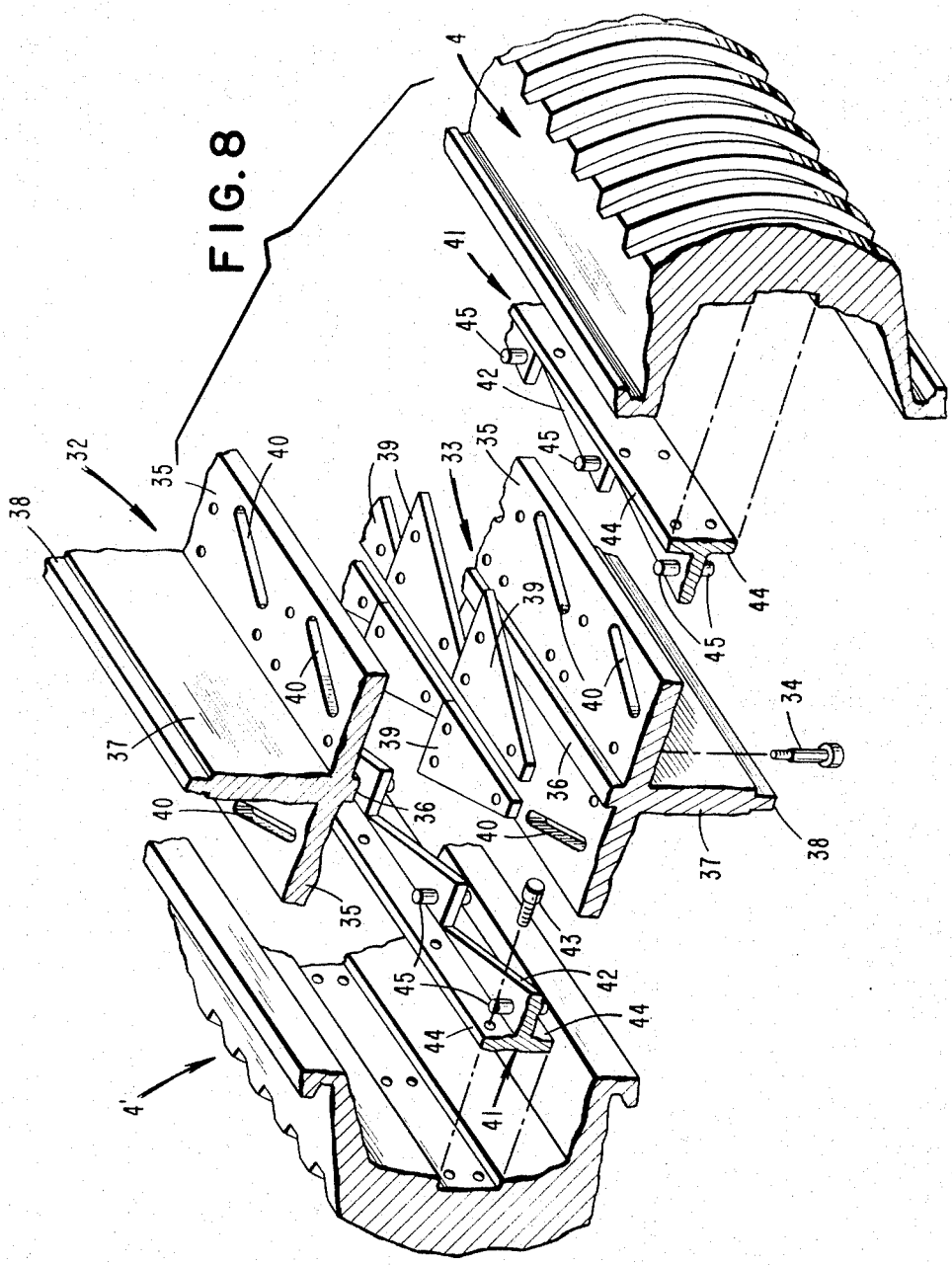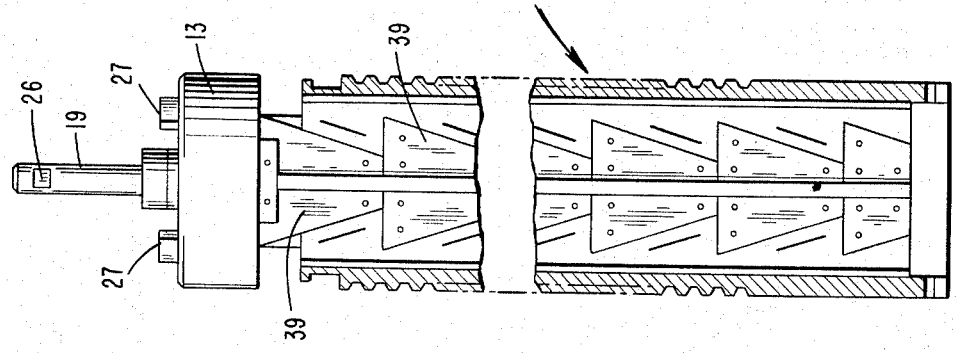

EXPANSIBLE SECTOR CORE FOR CURING BELTS

The present invention concerns an expansible sector mold intended to cure belts and, more particularly, it refers to the core of said mold.

The use of molds which permit the simultaneous treatment of several belts is already known in the technique of curing driving belts. Such molds comprise a core constituted by a cylindrical body provided with circumferential grooves, into which the uncured belts are housed, and an elastic bell to be inserted on the core on which the belts have been already applied. The mold is then introduced into an autoclave under pressure to effect the curing operation.

It is known that, in order to arrange the not yet cured belts on the mold core without subjecting them to prejudicial stresses, the core is made of expansible sectors.

Known expansible sector devices, however, incur faults during the curing phase, since their operations are effected at a relatively high pressure. The existence of such pressure gives rise in fact to a slight, uncontrolled and indeterminable variation in the diametrical dimensions of the core, and this variation reflects itself in a slight variation in the size of the belts, with a consequent reduction of their mechanical qualities and, above all, of their service life.

The present invention seeks to provide a core for a mold, in which such variation of the diametrical dimensions of said core is completely avoided.

Accordingly, the aforementioned object of the present invention is realized by means of an expansible sector mold for curing belts, which comprises a cylindrical core constituted by respective pairs of diametrically opposed sectors which circumferentially complement each other and which are symmetrically expansible and contractable relative to the central axis of the core. Further, such expansion and contraction of the sectors is effected by means of inter-engaging wedge elements first ones of which are carried by an axially movable slide element and second ones of which are carried by one of the sector pairs. The core further includes means for centering the sectors and also means for locking them in their expanded positions.

The present invention will be better understood from the following detailed description, made only by way of non-limiting example with reference to the attached sheets of drawing, in which:

FIG. 1 is an isometric view of the mold core of the invention;

FIG. 2 is an enlarged cross section of said mold core;

Figure 5:
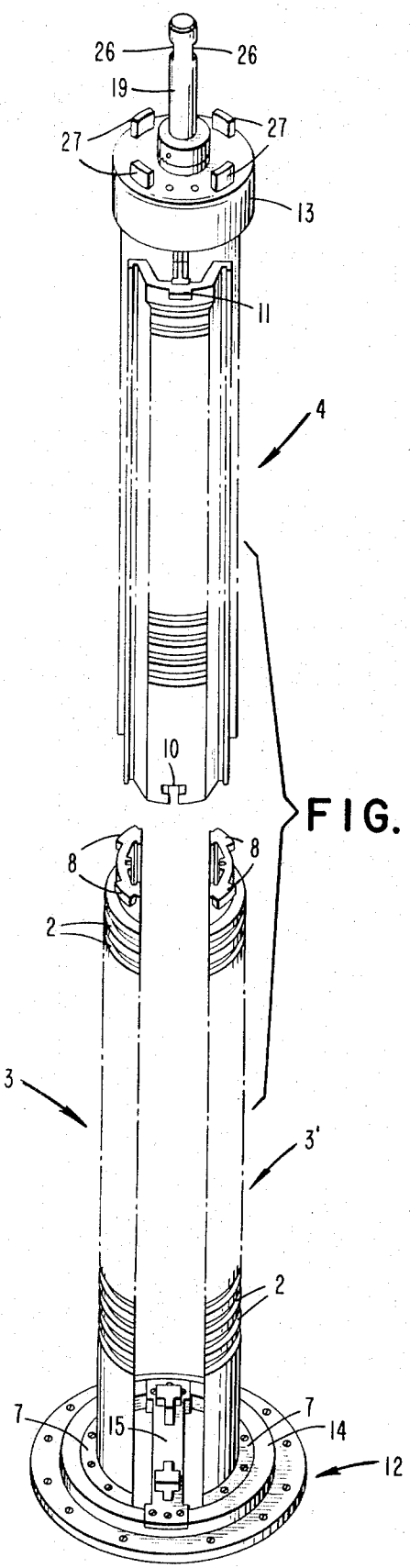
Figure 7:
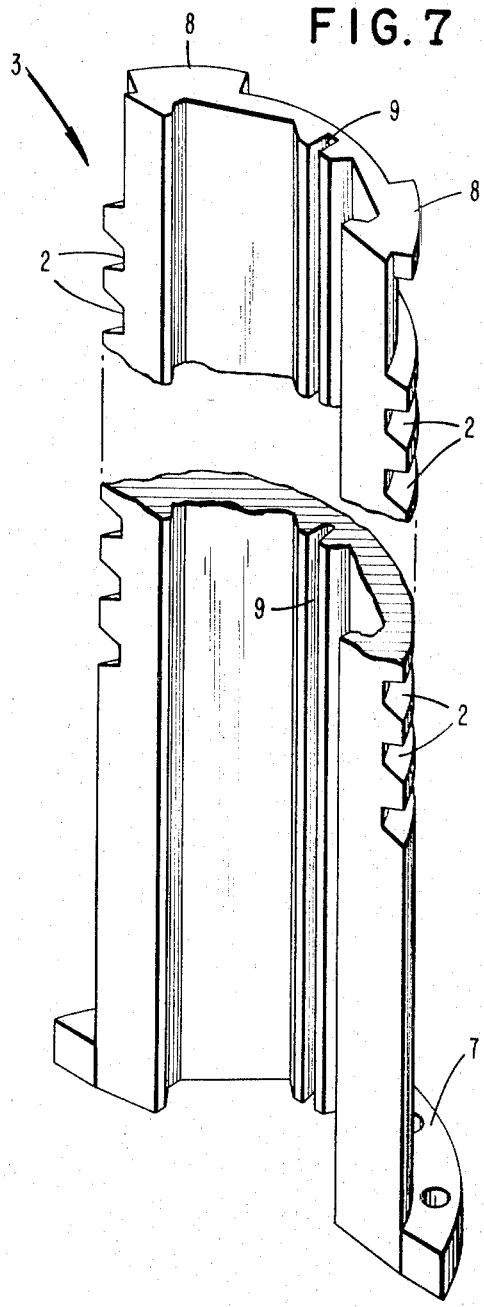

FIGS. 3 and 4 shown on an enlarged scale some details of the mold core;

FIG. 5 is an isometric view of the core, with pairs of sectors in detached position;

FIG. 6 is a longitudinal section of the mold core;

FIG. 7 shows on an enlarged scale and in isometric view a mold sector; and

FIG. 8 shows in exploded view the expansion device of the mold core.

The core of the mold for curing belts substantially constitutes a cylinder 1 having on its outer surface a plurality of circumferential grooves 2 intended to house the belts.

Said cylinder 1 is formed by two pairs of complementarily shaped sectors 3,3' 4,4', identical to each other in each pair.

Sectors 3,3', which will be hereafter referred to as "the first pair of sectors," are identical to each other and circumferentially alternate with sectors 4,4', which will be hereafter referred to as "the second pair of sectors" which also are identical to each other.

The sectors of the first pair are provided with ridges 5 defining longitudinal edges and the sectors of the second pair are provided with grooves 6 along their own longidtudinal edges.

The ridges 5 and the grooves 6 are complementary so that they interfit when the sectors are connected to each other to form cylinder 1.

Moreover, each sector of the first pair (FIG. 7) is provided with a radial external flange 7 at one end, with a plurality of cantilevered radial external projections 8 at the other end, and with a groove 9 on its internal concave face along the plane of symmetry of the sector 3.

In turn, each sector 4,4' of the second pair (FIG. 5) is provided with a T-shaped slot 10 at one end, and with a cantilevered radial projection 11, equal to the projections 8 of the first pair of sectors, at the other end.

Cylinder 1, obtained from the combination of the above described sectors, is attached to an annular flange 12 at one end and a cylindrical block 13 at the other end, in order to keep the sectors joined together.

The annular flange 12 (FIG. 3) has an annular step 14 on its surface directed towards cylinder 1 and a diametrical cross-piece 15 extending across said step. Said diametrical crosspiece 15 is provided with an abutment member 16 at each of its ends. The abutments are partially in the form of T-shaped elements. Said T-shaped elements are in fact each constituted by a radial rectangular body 17 and by two rectangular arms 18 which extend partially along the radial extent of said body.

The abutments 16 are connected to the diametrical cross-piece 15 by means of the body 17 and are positioned so that the part of said body devoid of the arms is nearest the axis of the mold core.

Moreover, the dimensions of the T-shaped portions of abutments 16 are such that said portions can be received without any clearance in the T-shaped slots 10 of the second pair of sectors.

The cylindrical block 13 (FIG. 4) is provided with a through hole along its central axis.

A shaft 19 extends through said hole; the shaft, being substantially formed by two parts constituted by coaxial cylindrical bodies 20 and 21, axially succeeding each other and having different diameters whereby a radial step is created. More precisely, the part 20, of smaller diameter extends through the hole in block 13.

Shaft 19 is moreover provided with a thread 22 on its part 20 of smaller diameter, so that, when said shaft 19 extends through the cylindrical block 13, a ring nut 23 can be screwed on said shaft whereby shaft 19 cannot disengage axially from the cylindrical block 13, and only relative rotation is possible between these elements. Further, shaft 19 is of such a length that it protrudes in cantilever fashion from both end faces 24 and 25 of the cylindrical block 13 and, in proximity of the end part 20 of shaft 19, where the latter has a smaller diameter, flattened portions 26, obtained by milling, are provided. Such flattened portions 26 are for firmly gripping shaft 19 with a suitable, not shown, device for moving said shaft.

The part 20 of smaller diameter protrudes in cantilever fashion from the upper face 24 of cylindrical block 13. Said face 24 is provided with a plurality of protuberances 27, having the task of transmitting rotation to block 13.

The protuberances 27 are permanently secured to the cylindrical block 13 or are integral therewith and are arranged along a circumference concentric to the axis of said cylindrical block 13.

The part 21 of larger diameter of shaft 19 protrudes in cantilever fashion from the lower face 25 of the cylindrical block 13. Said face 25 is provided with openings 28 which communicate with closed recesses 29 in the block 13.

In particular, the openings 28 are arranged along a circumference concentric to the axis of cylindrical block 13. Moreover, the dimensions of the openings 28 and of the closed recesses 29 are such that these can respectively receive and encase without clearance the radial projections 8 and 11, respectively on the first and the second pair of sectors, in the nature of a bayonet joint.

A part 31 of the device for effecting expansion and contraction of the sectors is rigidly connected, by means of screws 30 to the part 21 of shaft 19.

The device for carrying out the expansion and contraction of the sectors is shown in FIG. 8 and comprises a sliding element formed by two opposed cross members 32 and 33, rigidly connected together by means of screws 34.

The members 32 and 33 are essentially matching duplicates of each other, each one individually being generally T-shaped and when joined together with the other forms a cross (+) shape, their facing flanges or arms 35, however, being slightly spaced apart from each other by the combined radial height of axially extending short legs 36 which extend perpendicularly to the plane of arms 35 and radially oppositely to long legs 37 which, in turn, also extend perpendicularly to the plane of arms 35. When the members 32 and 33 are joined together, the faces of short legs 36 abut each other and the narrowed end portions 38 of long legs 37 fit within grooves 9 of sectors 3,3'. Further, the respective arms 35 are parallel to each other but spaced apart a distance sufficient to house the wedge plates 39 therebetween. Screw members 34 are employed to rigidly secure the members 32, 33 and 39 to each other.

Arms 35 include slots 40 which respectively extend parallel to respective ones of the inclined edges of wedge plates 39. It will be noted in this regard (FIG. 6) that wedge plates 39 as well as members 32 and 33 extend substantially the full axial extent of the sectors with said wedge plates 39 consisting of a plurality of axially successive identical rectangular trapeziums. The assembly of plates 39 with members 32 and 33 constitutes the aforementioned slide element 31.

The necessary means for effecting expansion and contraction of the sectors is completed by two T-shaped elements 41, whose body 42 is in the shape of a saw-tooth, so as to form a plurality of inclined planes complementary to those of plates 39. An element 41 is rigidly connected, by means of screws 43 and flanges 44 to each of sectors 4,4' so that the planes of symmetry of sectors 4,4' and those of elements 41 coincide. Moreover, pins 45 rigidly extending from both faces of wedges 42 of elements 41, slidingly fit within said slots 40 to provide a permanent link between slide element 31 and sectors 4,4'. The linkage is such that the sectors 4,4' are caused to simultaneously and equally move solely radially towards each other or away from each other in consequence of axial movement of the slide element 31 relative to said sectors.

Having described the elements forming the mold core, reference is now made to their operation.

The annular flange 12 is positioned on a horizontal plane in such a way that step 14 is turned upward (FIG. 5).

The flanges 7, carried at the ends of sectors 3,3' are positioned within the perimeter of annular flange 12 in such a way that they are not in contact with the latter. Uncured belts, in a number equal to the number of grooves 2, are placed around the sectors 3,3' so as to circumscribe them. The flanges 7 are brought into contact with the annular flange 12 and the uncured belts are correctly adjusted in the grooves 2.

The assembly formed by sectors 4,4', together with slide element 31 is introduced from the top.

To effect this introduction, said assembly is suspended from a manuevering device, not shown, which is connected to shaft 19 by means of the flattened portions 26 and therefore is in condition of maximum contraction.

This can be understood considering that element 31 for the expansion and contraction of the sectors is rigidly connected to shaft 19 and that (see FIG. 8) sectors 4,4' are connected to said device by means of pins 45 freely slidable within slots 40. By virtue of their own weight, sectors 4,4' are arranged in such a way that the pins 45 are situated in the lowest part of the slots 40. As the lower end of the slots is the nearest to the axis of the device for the expansion and contraction of the sectors, it follows that such sectors 4,4' are situated at the minimum possible mutual distance apart.

Further, when sectors 4,4' are in condition of maximum contraction, the inclined edges of plates 39 are completely in contact with the inclined edges of the saw-tooth shaped body of elements 41.

When sectors 4,4' are inserted between sectors 3,3', the slots 10 are fitted onto body 17, devoid of arms, and the narrowed ends 38 of elements 31 are inserted into grooves 9 of sectors 3,3'.

Then the cylindrical block 13 is pushed downwards and the projections 8 and 11, carried by the sectors, are caused to penetrate within the openings 28 obtained on face 25 of cylindrical block 13. In consequence of this operation, the wedges which make up plates 39 are pushed axially along the inclined planes of the saw-toothed profile of the body of the T-shaped elements 41 which are rigid with sectors 4,4' so that the latter are forced radially apart from each other, and the pins 45 slide within the slots 40 away from the axis of the double cross element. Further to the mutual detachment of sectors 4,4', the grooves 6, with which they are provided, engage the ridges 5 of sectors 3,3'.

Moreover, the T-shaped slots 10 of sectors 4,4' engage the abutments 16 in the part of the latter provided with arms 18. The insertion of the abutments 16 within the slots 10 prevents any upward displacement of sectors 4,4'.

At this moment, cylindrical block 13 is rotated relative to the sectors whereby projections 8, 11 penetrate into the closed-bottom recesses 29 in cylindrical block 13, in such a way as to obtain a bayonet connection therebetween.

Consequently, the mold core is assembled and fixed in its cylindrical shape.

After this, an elastic bell is inserted on the core, already carrying the belts, and the mold is so completed.

Subsequently, the mold is placed in an autoclave to effect the curing operation. Within the autoclave the belts are cured by means of the combined action of heat and pressure, sometimes at high pressure values, as for instance between 10 and 20 atm.

In spite of these high pressure values, no modification is noticed in the diametrical dimensions of the core, since the sectors constituting it are internally supported along a whole generatrix thereof. After curing, and after having removed the mold from the curing unit, the elastic bell is detached from the core.

Then the core is dismantled to remove the belts; to this end the core is secured, at its annular flange 12, to a horizontal plane.

Cylindrical block 13 is rotated with respect to the sectors in order to disengage the radial projections 8, 11 from the closed recesses 29 and to arrange said radial projections 8, 11 in the openings 28.

By means of the aforementioned manuevering device, not represented, shaft 19 is gripped at its flattened portion 26 and lifted.

As the element 31 for the expansion of the core is rigidly connected to shaft 19, by raising the latter, so also element 31 rises.

Further to the lifting, the device for contraction of the core can start its operation.

In fact, the pins 45 on the sectors 4,4' approach the core axis in consequence of the upward motion of said shaft 19. This is due to the fact that the slots 40, with respect to a person looking at the core from the top, converge towards the core axis, and to the fact that arms 18 of abutments 16, housed in the T-shaped slots 10, prevent any upward motion of sectors 4,4', allowing only their mutual radial approach.

Consequently, at first there is only a mutual radial approach of sectors 4,4' and the T-shaped slots 10 of the latter subsequently disengage from abutments 16 so that there is then an upward motion of sectors 4,4'.

By proceeding with the lifting of shaft 19, sectors 4,4' are detached from sectors 3,3'. Finally sectors 3,3' are mutually approached and the cured belts are removed.

Although a preferred embodiment of the invention has been described and illustrated, it is understood that said invention includes in its scope any alternative embodiment deriving from the above indicated inventive concept.

What is claimed is:

1. An expansible and collapsible sector mold for curing driving belts comprising
two pairs of sectors which form the mold core in their entirety;
a pair of structural shapes having a saw-toothed projection and rigidly connected to the inside of a sector pair, and a plurality of small pegs carried by the saw-toothed projection;
a longitudinal groove present in the inside of the sectors of the other pair;
a sliding element having a plurality of projections aligned on two longitudinal lines and having a shape complementary to that of said saw-toothed structural shapes, said sliding element being provided with a plurality of slots, oblique with respect to the axis of the sliding element and intended to encase said small pegs, and
with a pair of continuous longitudinal ribs capable of engaging with the continuous longitudinal grooves of said other pair, when the core is in expanded condition,
whereby each sector of the core in expanded condition is internally supported along a continuous line.

2. The sector mold of claim 1 wherein said sliding element comprises a cross-shaped assembly including mutually perpendicular pairs of legs, one pair of the opposed legs including said slots while the ends of the thereto perpendicular pair of opposed legs slidingly engage respective central grooves in the other pair of sectors.

3. The sector mold of claim 2 wherein said cross-shaped assembly comprises a pair of T-shaped members fixedly joined to each other in back to back relationship with a space between their respective backs.

4. The sector mold of claim 1 further including respective flange means at each end of said sectors for lockingly engaging said sectors against any axial or radial movement relative to each other.

5. The sector mold of claim 4 wherein said flange means and the ends of said sectors include bayonet-type locking means.

6. The sector mold of claim 5, wherein the first of said flange means includes a said locking means for only one pair of said sectors while the second of said flange means includes a said locking means for all said pairs of sectors, the locking means of said first flange means comprising an abutment means axially lockingly engageable with a pair of said sectors only pursuant to radial movement of these sectors relative to said abutment means, while the locking means of said second flange means comprises a slot and projection combination which effects locking engagement through relative axial and rotative movement of the parts to be locked together.

* * * * *